US012603898B2

(12) United States Patent　(10) Patent No.:　US 12,603,898 B2
Roy et al.　(45) Date of Patent:　Apr. 14, 2026

(54) SYSTEMS AND METHODS FOR INTRUSION DETECTION USING FEDERATED LEARNING

(71) Applicant: North Carolina Agricultural and Technical State University, Greensboro, NC (US)

(72) Inventors: Kaushik Roy, Greensboro, NC (US); Zhipeng Liu, Greensboro, NC (US); Xiaohong Yuan, Greensboro, NC (US); David Johnson, Greensboro, NC (US)

(73) Assignee: North Carolina Agricultural and Technical State University, Greensboro, NC (US)

( * ) Notice: Subject to any disclaimer, the term of this patent is extended or adjusted under 35 U.S.C. 154(b) by 182 days.

(21) Appl. No.: 18/411,856

(22) Filed: Jan. 12, 2024

(65) Prior Publication Data

US 2024/0244064 A1　Jul. 18, 2024

Related U.S. Application Data

(60) Provisional application No. 63/438,722, filed on Jan. 12, 2023.

(51) Int. Cl.
*H04L 9/40*　(2022.01)
*H04L 41/16*　(2022.01)

(52) U.S. Cl.
CPC .......... *H04L 63/1416* (2013.01); *H04L 41/16* (2013.01)

(58) Field of Classification Search
CPC ............................ H04L 63/1416; H04L 41/16

USPC .......................................................... 726/22
See application file for complete search history.

(56) References Cited

U.S. PATENT DOCUMENTS

2024/0265311 A1 * 8/2024 Ren ........................... G06F 9/50

OTHER PUBLICATIONS

Addison Shaver, Zhipeng Liu, Niraj Thapa, Kaushik Roy, Balakrishna Gokaraju, Xiaohong Yuan (Oct. 13-15, 2020). Anomaly Based Intrusion Detection for IoT with Machine Learning. In 2020 IEEE Applied Imagery Pattern Recognition Workshop (AIPR) (pp. 1-6). IEEE.

(Continued)

*Primary Examiner* — Lan Dai T Truong
(74) *Attorney, Agent, or Firm* — Jenkins, Taylor & Hunt, P.A.

(57) ABSTRACT

Methods and systems for intrusion detection using federated learning. In some examples, a system includes a central server configured for generating an initial security model and distributing the initial security model to edge nodes. Each edge node is configured for executing an intrusion detection system. The system includes a first subset of edge nodes each of which is configured for training a respective local security model using captured security data during live operation. The system includes a second subset of edge nodes each of which is not configured for training a local security model. The system includes fog nodes, each fog node being on a communications path between at least one edge node and the central server. At least a first fog node is configured for training a respective local security model for one or more of the edge nodes from the second subset of edge nodes.

26 Claims, 9 Drawing Sheets

(56)          References Cited

OTHER PUBLICATIONS

Alaiz-Moreton, H., Aveleira-Mata, J., Ondicol-Garcia, J., Muñoz-Castañeda, A. L., García, I., & Benavides, C. (2019). Multiclass classification procedure for detecting attacks on MQTT-IoT protocol. Complexity, 2019.

Bagaa, M., Taleb, T., Bernabe, J. B., & Skarmeta, A. (2020). A machine learning security framework for iot systems. IEEE Access, 8, 114066-114077.

Bahaa, A., Abdelaziz, A., Sayed, A., Elfangary, L., & Fahmy, H. (2021). Monitoring Real Time Security Attacks for IoT Systems Using DevSecOps: A Systematic Literature Review. Information, 12(4), 154.

Baidu PaddlePaddle Releases 21 New Capabilities to Accelerate Industry-Grade Model Development. Available online: https://research.baidu.com/Blog/index-view?id=126 (accessed on Sep. 24, 2020).

Bouachir, O., Aloqaily, M., Tseng, L., & Boukerche, A. (2020). Blockchain and fog computing for cyberphysical systems: The case of smart industry. Computer, 53(9), 36-45.

Duy, P. T., Khoa, N. H., Nguyen, A. G. T., & Pham, V. H. (2021). DIGFuPAS: Deceive IDS with GAN and Function-Preserving on Adversarial Samples in SDN-enabled networks. Computers & Security, 102367.

Goli, T., & Kim, Y. (2021). A Survey on Securing IoT Ecosystems and Adaptive Network Vision. International Journal of Networked and Distributed Computing.

Goodfellow, Ian; Pouget-Abadie, Jean; Mirza, Mehdi; Xu, Bing; Warde-Farley, David; Ozair, Sherjil; Courville, Aaron; Bengio, Yoshua (2014). Generative Adversarial Nets. Proceedings of the International Conference on Neural Information Processing Systems (NIPS 2014). pp. 2672-2680.

Google Research, "Federated Learning: Collaborative Machine Learning without Centralized Training Data," Available at https://ai.googleblog.com/2017/04/federated-learning-collaborative.html. Accessed on Aug. 3, 2021.

Haseeb, K., Ud Din, I., Almogren, A., & Islam, N. (2020). An energy efficient and secure IoT-based WSN framework: An application to smart agriculture. Sensors, 20(7), 2081.

Idrissi, I., Boukabous, M., Azizi, M., Moussaoui, O., & El Fadili, H. (2021). Toward a deep learning-based intrusion detection system for IoT against botnet attacks. IAES International Journal of Artificial Intelligence, 10(1), 110.

Iwendi, C., Rehman, S. U., Javed, A. R., Khan, S., & Srivastava, G. (2021). Sustainable Security for the Internet of Things Using Artificial Intelligence Architectures. ACM Transactions on Internet Technology (TOIT), 21(3), 1-22.

Keserwani, P. K., Govil, M. C., Pilli, E. S., & Govil, P. (2021). A smart anomaly-based intrusion detection system for the Internet of Things (IOT) network using GWO-PSO-RF model. Journal of Reliable Intelligent Environments, 7(1), 3-21.

Kholod, I., Yanaki, E., Fomichev, D., Shalugin, E., Novikova, E., Filippov, E., & Nordlund, M. (2021). Open-Source Federated Learning Frameworks for IoT: A Comparative Review and Analysis. Sensors, 21(1), 167.

Lao, L., Li, Z., Hou, S., Xiao, B., Guo, S., & Yang, Y. (2020). A survey of IoT applications in blockchain systems: Architecture, consensus, and traffic modeling. ACM Computing Surveys (CSUR), 53(1), 1-32.

Let's Solve Privacy, Available online: https://www.openmined.org/ (accessed on Sep. 24, 2020).

Li, T., Sahu, A. K., Talwalkar, A., & Smith, V. (2020). Federated learning: Challenges, methods, and future directions. IEEE Signal Processing Magazine, 37(3), 50-60.

Liu, Y. J., Wang, J., & Zhao, Y. (2021). Intrusion Detection of Vehicle Based on Generative Adversarial Networks. In Journal of Physics: Conference Series (vol. 1757, No. 1, p. 012052). IOP Publishing.

Matheu, S. N., Robles Enciso, A., Molina Zarca, A., Garcia-Carrillo, D., Hernández-Ramos, J. L., Bernal Bernabe, J., & Skarmeta, A. F. (2020). Security architecture for defining and enforcing security profiles in DLT/SDN-based IoT systems. Sensors, 20(7), 1882.

Molina Zarca, A., Bagaa, M., Bernal Bernabe, J., Taleb, T., & Skarmeta, A. F. (2020). Semantic-aware security orchestration in SDN/NFV-enabled IoT systems. Sensors, 20(13), 3622.

Navidan, H., Moshiri, P. F., Nabati, M., Shahbazian, R., Ghorashi, S. A., Shah-Mansouri, V., & Windridge, D. (2021). Generative Adversarial Networks (GANs) in networking: A comprehensive survey & evaluation. Computer Networks, 108149.

Niraj Thapa, Zhipeng Liu, Dukka B. KC, Balakrishna Gokaraju, Kaushik Roy. (Sep. 30, 2020). Comparison of Machine Learning and Deep Learning models for Network Intrusion Detection Systems. Future Internet 2020, 12(10), 167; https://doi.org/10.3390/fi12100167.

Niraj Thapa, Zhipeng Liu, Addison Shaver, Albert Esterline, Balakrishna Gokaraju, Kaushik Roy (Jul. 21, 2021). Secure Cyber Defense: An Analysis of Network Intrusion-Based Dataset CCD-IDSv1 with Machine Learning and Deep Learning Models. Electronics, 10(15), 174.

Nukavarapu, S. K., & Nadeem, T. (2021, March). Securing Edge-based IoT Networks with Semi-Supervised GANs. In 2021 IEEE International Conference on Pervasive Computing and Communications Workshops and other Affiliated Events (PerCom Workshops) (pp. 579-584). IEEE.

Qu, Y., Gao, L., Luan, T. H., Xiang, Y., Yu, S., Li, B., & Zheng, G. (2020). Decentralized privacy using blockchain-enabled federated learning in fog computing. IEEE Internet of Things Journal, 7(6), 5171-5183.

Sabir, B. E., Youssfi, M., Bouattane, O., & Allali, H. (2020). Towards a new model to secure IoT-based smart home mobile agents using blockchain technology. Engineering, Technology & Applied Science Research, 10(2), 5441-5447.

Saha, R., Misra, S., & Deb, P. K. (2020). FogFL: Fog-Assisted Federated Learning for Resource-Constrained IoT Devices. IEEE Internet of Things Journal, 8(10), 8456-8463.

Shieh, C. S., Lin, W. W., Nguyen, T. T., Huang, Y. L., Horng, M. F., Lo, C. C., & Tu, K. M. (2022) Detection of Adversarial DDOS Attacks Using Generative Adversarial Networks with Dual Discriminators, Symmetry, vol. 14(66).

Singh, S. K., Jeong, Y. S., & Park, J. H. (2020). A deep learning-based IoT-oriented infrastructure for secure smart city. Sustainable Cities and Society, 60, 102252.

TensorFlow Federated: Machine Learning Decentralized Data. Available online: https://www.tensorflow.org/federated (accessed on Sep. 24, 2020).

Thakkar, A., & Lohiya, R. (2021). A review on machine learning and deep learning perspectives of IDS for IoT: recent updates, security issues, and challenges. Archives of Computational Methods in Engineering, 28(4), 3211-3243.

Ullah, I., & Mahmoud, Q. H. (2021). A Deep Learning Based Framework for Cyberattack Detection in IoT Networks. IEEE Access.

Ullah, I., Ullah, A., & Sajjad, M. (2021). Towards a Hybrid Deep Learning Model for Anomalous Activities Detection in Internet of Things Networks. IoT, 2(3), 428-448.

Vu, S. N. T., Stege, M., El-Habr, P. I., Bang, J., & Dragoni, N. (2021). A Survey on Botnets: Incentives, Evolution, Detection and Current Trends. Future Internet, 13(8), 198.

Wang, W., Feng, C., Zhang, B., & Gao, H. (2019). Environmental monitoring based on fog computing paradigm and internet of things. IEEE Access, 7, 127154-127165.

We Research and Build Artificial Intelligence Technology and Services, Available online: https://sherpa.ai/ (accessed on Sep. 24, 2020).

Wu, Q., He, K., & Chen, X. (2020). Personalized federated learning for intelligent IoT applications: A cloud-edge based framework. IEEE Open Journal of the Computer Society, 1, 35-44.

Xu, G. (2020). IoT-assisted ECG monitoring framework with secure data transmission for health care applications. IEEE Access, 8, 74586-74594.

(56)         References Cited

OTHER PUBLICATIONS

Yao, J., & Ansari, N. (2020). Enhancing federated learning in fog-aided IoT by CPU frequency and wireless power control. IEEE Internet of Things Journal, 8(5), 3438-3445.

Zhang, H., Anilkumar, A., Fredrikson, M., & Agarwal, Y. (2021). Capture: Centralized Library Management for Heterogeneous IoT Devices. In USENIX Security Symposium.

Zhipeng Liu, Niraj Thapa, Addison Shaver, Kaushik Roy, Madhuri Siddula, Xiaohong Yuan, Anna Yu. (Jul. 15, 2021). Using Embedded Feature Selection and CNN for Classification on CCD-INID-V1—A New IoT Dataset. Sensors, 21(14), 4834.

Zhipeng Liu, Niraj Thapa, Addison Shaver, Kaushik Roy, Xiaohong Yuan, Sajad Khorsandroo. (Aug. 6-7, 2020). Anomaly Detection on IoT Network Intrusion using Machine Learning. 2020 International Conference on Artificial Intelligence, Big Data, Computing and Data Communication Systems (icABCD). shorturl.at/chmC0.

* cited by examiner

SYSTEMS AND METHODS FOR INTRUSION DETECTION USING FEDERATED LEARNING

CROSS-REFERENCE TO RELATED APPLICATIONS

This application claims benefit of U.S. Provisional Application Ser. No. 63/438,722, filed on Jan. 12, 2023, the disclosure of which is incorporated herein by reference in its entirety.

TECHNICAL FIELD

This specification relates generally to methods, systems, and computer readable media for intrusion detection using federated learning.

BACKGROUND

An Internet of Things (IoT) device is physical device that is connected to the internet and can collect, transmit, and sometimes act on data. Such devices are typically embedded with sensors and other components that allow them to gather data about their surroundings, such as temperature, humidity, or motion. They also typically can communicate this data to other devices or systems over the internet, either through wired or wireless connections.

Some common examples of IoT devices include smart thermostats, smart appliances, wearable fitness trackers, and security cameras. These devices often have a specific function or purpose, such as controlling the temperature of a room or tracking physical activity. They can also be integrated with other systems or devices, such as smart home systems or mobile apps, to provide additional functionality or control.

IoT devices can be used in a variety of applications, including home automation, energy management, healthcare, and transportation. They have the potential to greatly improve efficiency and convenience by automating tasks and providing real-time data and control over a wide range of systems and devices. However, they also raise concerns about security, privacy, and the potential for misuse or abuse of the data they collect and transmit.

SUMMARY

This document describes methods and systems for intrusion detection using federated learning. In some examples, a system includes a central server configured for generating an initial security model trained on training data characterizing a plurality of different computer security threats and distributing the initial security model to edge nodes. Each edge node comprises at least one processor configured for executing an intrusion detection system using the initial security model. The system includes a first subset of edge nodes each of which is configured for training a respective local security model using captured security data during live operation. The system includes a second subset of edge nodes each of which is not configured for training a local security model. The system includes fog nodes, each fog node being on a communications path between at least one edge node and the central server. At least a first fog node comprises a processor configured for training a respective local security model for one or more of the edge nodes from the second subset of edge nodes. The central server is configured for updating the intrusion detection systems of the edge nodes by: collecting the local security models from the first subset of edge nodes and the first fog node; selecting a first local security model from the collected local security models to replace the initial security model; and distributing the first local security model to the edge nodes, causing each of the edge nodes to execute the intrusion detection system using the first local security model.

The computer systems described in this specification may be implemented in hardware, software, firmware, or any combination thereof. In some examples, the computer systems may be implemented using a computer readable medium having stored thereon computer executable instructions that when executed by the processor of a computer control the computer to perform steps. Examples of suitable computer readable media include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
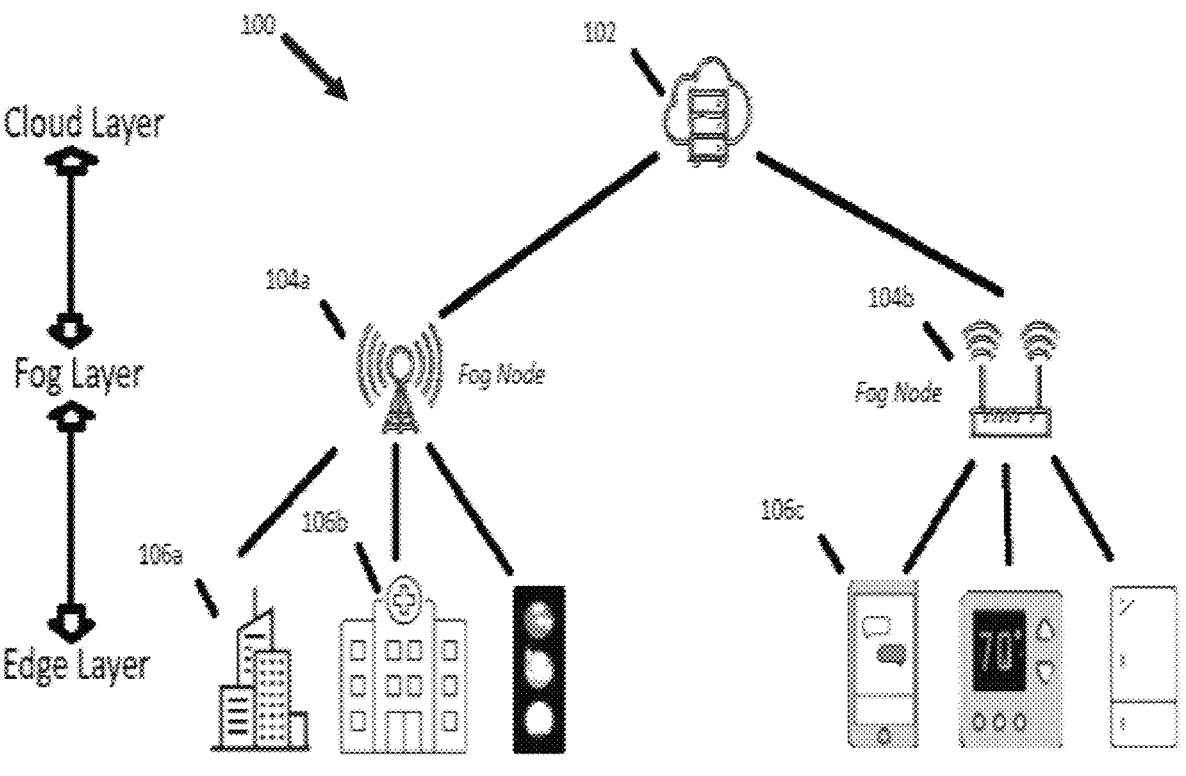
FIG. 1 Three layer diagram showing, from the bottom up, the edge layer, the fog layer, and the cloud layer. The edge layer consists of edge devices that collect information about their environment and can perform tasks based on the recorded information. The fog layer consists of fog nodes placed between the edge layer and the cloud layer which communicates trained models to and from edge devices and the central server. The fog nodes also are able to train models on behalf of edge devices when those devices lack the computational resources to train local models. The cloud layer consists of a central server which generates the initial global model for use by edge devices, and also periodically updates the global model based on data received by fog nodes.

Internet-of-Things (IoT) devices have become increasingly popular for use in many industries. These devices collect information about their surroundings and can perform some function based on the collected data. IoT devices are used to make life easier along with automating industry actions so a human does not need to always be present to perform the action. It is estimated that by 2025, there will be about 55.7 billion IoT devices connected, generating upwards of 80 zettabytes (one zettabyte=one trillion gigabytes).

IoT devices are used in many industries, such as smart agriculture, smart healthcare, smart homes, Much like with computers and smart phones, IoT devices run on an operating system and use communication channels that are popular to use. For example, computers tend to use Windows, OS X, or Linux, while mobile phones tend to use iOS or Android. IoT devices, similar to personal computers, oftentimes use Windows or Linux, with Linux representing the majority of IoT operating systems. Although these devices are capable of running the operating systems that are on more powerful computers, the devices may not have the resources to adequately train deep learning models on-device.

As IoT devices generate large amounts of data, this data must also be processed. This processing tends to happen on a centralized server, where the data from the IoT devices are transmitted to the central server. This is a process that takes a lot of time and memory capacity. As the number of IoT devices in a system increases, the volume of data that is sent over various communication channels increases, requiring more robust communication methods. IoT devices in different locations performing different functions also increases the heterogeneity of the collected data. There have been IoT-based architectures proposed to handle the distributed nature of IoT devices on a network, such as the blockchain architecture. In addition to having to maintain these communication networks for IoT devices, people, businesses, and governments enjoy keeping their data private. Federated learning (FL) is used to address protecting data privacy and mitigating misuse of data. By keeping the sensitive data on the collection device and training a model on this data, the model can be distributed to other areas for use without needing to transmit any of the sensitive data.

There are some works that use FL to propose DL-based IDS incorporating IoT devices, although a large limitation with these works is that the architecture is based on a simulation, rather than using actual IoT devices. It is not uncommon for IoT devices to not have the processing power or memory capacity to train deep learning models of the needed size. We mitigate this limitation of edge IoT devices by utilizing fog nodes within the fog layer that will handle local model training in place of the edge devices that cannot train local models on-device. The fog layer will also collect available local models trained by edge devices, or by the fog node themselves for more reliable transfer to the cloud layer for further processing.

With many IoT devices, the bandwidth required to communicate with the between devices also needs to be large and sufficient. Compression methods such as quantization has been used to reduce communication overhead between edge devices and the central server for F, such as with the FedPaq algorithm. Quantization is a lossy compression method. We will use lossless compression for floating points as mentioned in a couple of works. Using compression, we can reduce the communication overhead significantly, decreasing the time and bandwidth to transfer the models between layers.

A large company has many locations. All locations access shared data through a centralized server. The devices connected within the organization network can be identified as edge devices or edge nodes. Together, the interconnected devices, including the central server, form a giant network of IoT. To safeguard the edge nodes from malicious cyberattacks, an intrusion detection system (IDS) is the most effective defense mechanism available.

A state-of-the-art IDS is known for its highly trained machine learning model. The model requires large amount of data and high computational resource to train and test. The model is most likely to be trained on the centralized server, which usually contains a large amount of data and has abundant computational resources. The data is collected from each location at varying time intervals. After setting a cutoff timestamp, all data collected prior to the timestamp is used to train the IDS model. The trained IDS model is then tested and deployed on the next queued security update to all edge nodes in all locations. The whole process can be viewed as a security update.

Unfortunately, the process from data collection to final model deployment and setup is not swift. Each step in the process may require a lengthy period. If new cyberattack data are collected after the cutoff timestamp, in order to create a new model that can detect the new cyberattacks, the newly collected data have to be merged with the existing dataset to train the new model. Because of the large time gaps that typically exist between security updates, the edge nodes within such an IoT network can be left vulnerable to new attacks.

To deploy a new IDS, a machine learning model typically must be written, trained, and tested many times (generally alpha and beta versions) before it is officially installed. This entire process can be time consuming-on average, a net operations engineer requires 33% more time identifying and troubleshooting network issues, 30% more time detecting vulnerabilities and threats to take remediation steps and rectify such issues, and 37% more time analyzing and exploring advancements in automation. To shorten the time between a system update and a new deployment, one strategy is the use of a responsive framework that consists of several machine learning models that are updated in real-time.

Federated learning is a type of machine learning in which multiple devices or systems work together to train a shared model, without the need to centralize the data used for training. In federated learning, each device or system has its own data, and the shared model is trained by sending model updates back and forth between the devices and a central server. The devices each use their own data to train a local version of the model, and then send the updates to the central server, which aggregates the multiple local models to create a single global, or shared, model.

One of the main benefits of federated learning is that it allows for the training of models on a large amount of data without the need to centralize or transfer that data. This can be particularly useful in situations where the data is sensitive or proprietary, or where it is impractical or infeasible to transfer the data due to its size or location. Federated learning can also be more efficient and faster than traditional machine learning approaches, as the model can be trained in parallel on multiple devices.

Using federated learning on a network with a large number of devices can incur high communication costs. In addition to using federated learning, the communication costs of transferring large amounts of local security model updates are lowered by compressing the local security model updates when transferring between the edge layer and fog layer, and also when transferring between the fog layer and the cloud layer.

FIG. 1 is a block diagram of an example system 100 for intrusion detection using federated learning. The arrangement in FIG. 1 shows the topology of the federated learning-based intrusion detection system (FLIDS). The FLIDS contains three distinct layers. In FIG. 1, one sees a Cloud Layer 102, a Fog Layer 104a-b, and an Edge Layer 106a-c. Between each layer, there is efficient bidirectional communication.

The cloud layer includes a central server 102. The fog layer includes a number of fog nodes 104a-b, and the edge layer includes a number of edge nodes 106a-c. The fog nodes 104a-b can be located on communications paths between the edge nodes 106a-c and the central server 102. The central server 102 is configured for generating an initial security model trained on training data characterizing a plurality of different computer security threats and distributing the initial security model to the edge nodes 106a-c and, typically, the fog nodes 104a-b too.

The edge nodes 106a-c can be IoT devices. Some of the edge nodes 106a-c are configured for capturing data during live operation and for training a local security model using the captured data. Some other edge nodes are not configured for training a local model; for example, some edge nodes may lack computing resources for training a local security model.

The fog nodes 104a-b can be IoT devices. Fog nodes are typically configured solely as data communication intermediary. Some of the fog nodes 104a-b may be routers, switches, or wireless access points. At lease one of the fog nodes 104a-b is configured to train local security model updates for one or more of the edge nodes 106a-c that are not configured for training local security model updates. This can be useful where a fog node has more computational resources than the edge nodes. This fog node is in communication with one or more of the edge nodes 106a-c by either a wired or wireless data communication path.

The central server 102 is configured for updating the IDS model of the edge nodes 106a-c by:

1. Collecting the local model updates from edge nodes 106a-c;
2. Selecting a first local model from the collected local models to replace the initial IDS model;
3. Distributing the first local IDS model to the edge nodes 106a-c, causing each of the edge nodes 106a-c to execute the IDS using the first local model.

Figure 2:
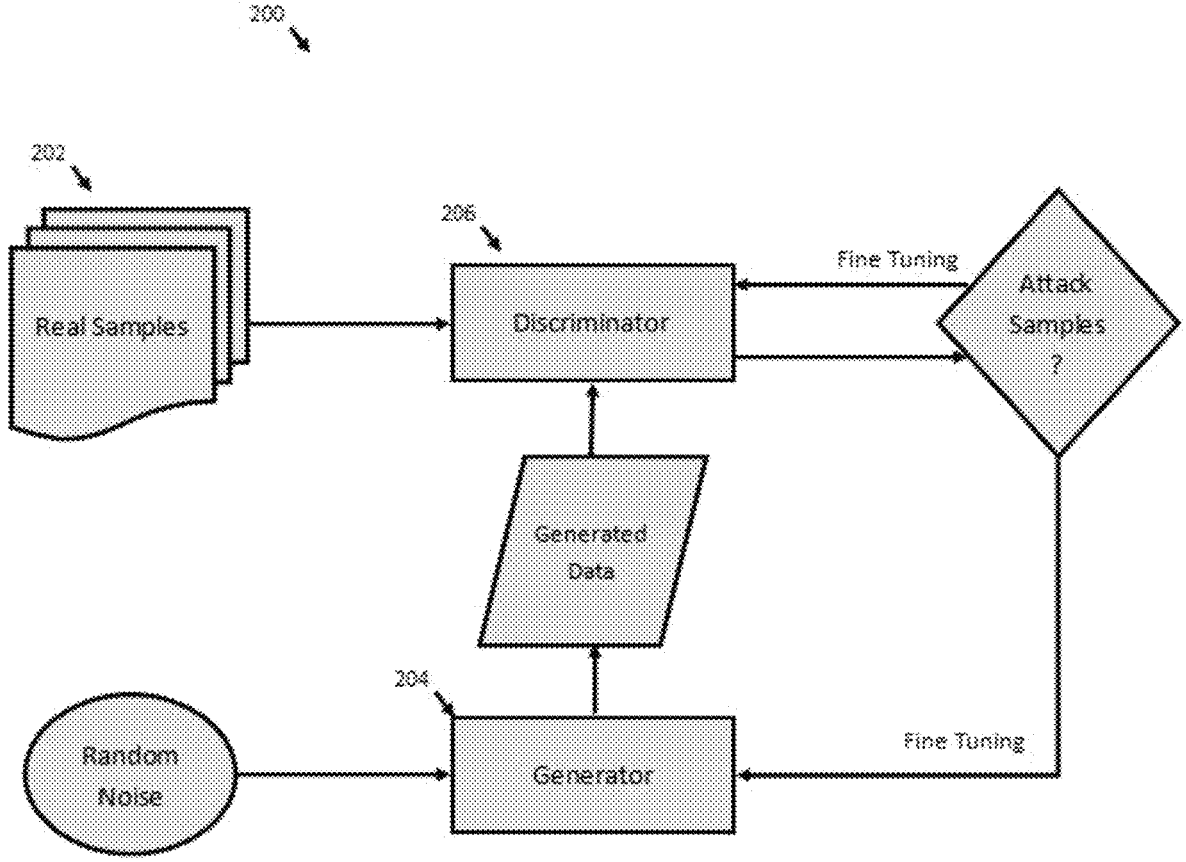
FIG. 2 Diagram of Generative Adversarial Network. The discriminator is trained on real data samples and also generated data from the Generator to classify normal and attack data samples. The results of the Discriminator is used to further train the Generator to try to produce samples to trick the Discriminator into classifying generated samples as attack from the Generator. To produce samples, the Generator is provided with random noise or data as a seed to produce data based on the noise. Ideally, a Generator trained to trick a Discriminator, which was trained on real samples and samples from the Generator, should produce hyper-realistic samples that would seem like real attack samples. If this is the case, the Generator can produce more samples that realistically resemble attack samples.

FIG. 2 is a block diagram of a model 200 for intrusion detection using a generative adversarial network (GAN). It is comprised of two models, 204 and 206, to produce hyper-realistic data samples that are closely similar to the real data samples 202, which 206 is already trained on classifying with high accuracy. As 204 produces generated data samples, 206 classifies the generated samples as normal or attack samples. The generated samples along with their corresponding classification decision is used to further train both 204 and 206. When 204 is able to generate attack samples that 206 classifies as "attack," then the GAN is able to produce realistic attack samples to train the DL-based IDS models.

The central server 102 of FIG. 1 can use a GAN to generate the initial security model. The model 200 uses training data 202 including real data samples of computer security threats (e.g., malware files) and network security threats and a generator 204 for generating adversarial examples and injecting the adversarial examples into the training data 202.

GANs are a type of machine learning model that can be used to train an intrusion detection system. GANs usually comprise two sub-models working in tandem, a generator 204 and a discriminator 206. The generator 204 generates synthetic data to trick the discriminator 206 into classifying the synthetic data as real data, while the discriminator 206 attempts to distinguish the synthetic data from real data.

To use GANs to train an intrusion detection system, one can first collect a large dataset of both normal and malicious network traffic. The generator can then be trained to generate synthetic normal traffic, while the discriminator is trained to distinguish between the synthetic normal traffic and the real malicious traffic.

During training, the generator and discriminator are both optimized simultaneously. The generator is trained to generate synthetic data that is increasingly difficult for the discriminator to distinguish from real data, while the discriminator is trained to become better at distinguishing between the synthetic and real data.

Once the GAN has been trained, it can be used to generate synthetic normal traffic for use in testing the intrusion detection system. The intrusion detection system can then be trained on this synthetic normal traffic and real malicious traffic, allowing it to learn to identify malicious traffic in a more robust and efficient way.

Figure 3:
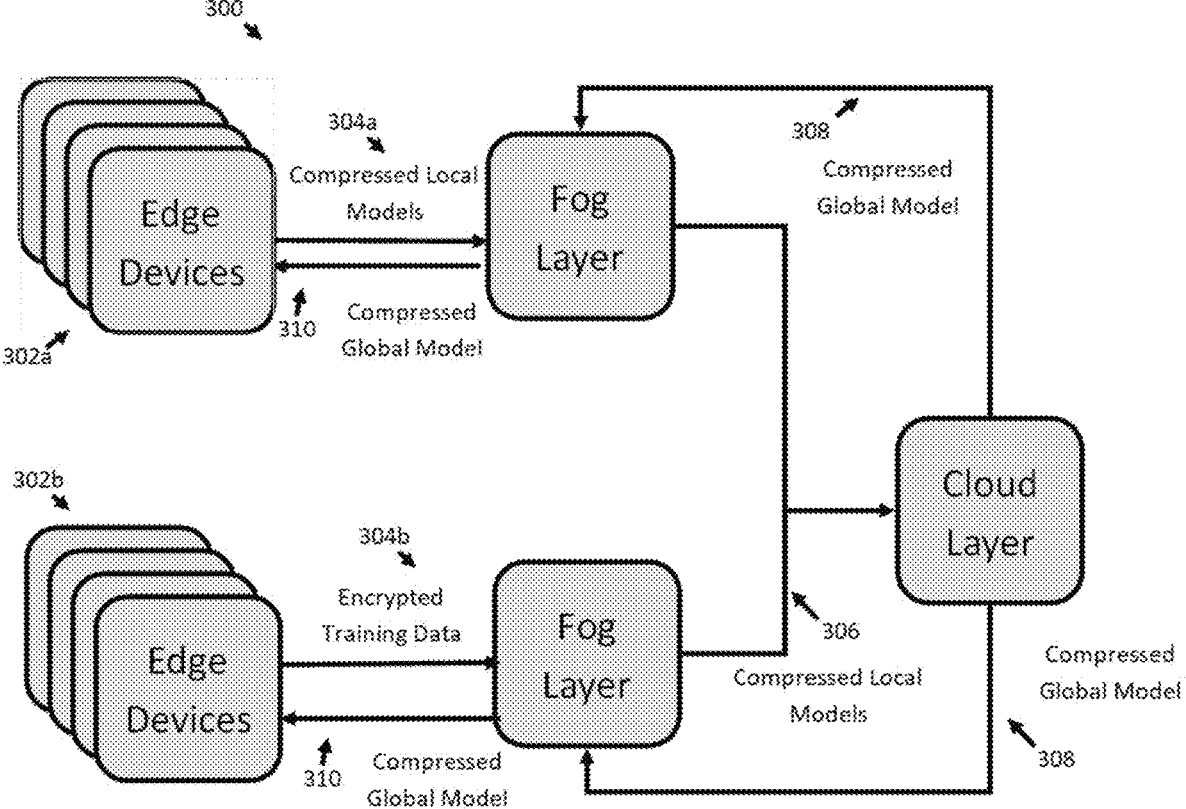
FIG. 3 Diagram showing two sets of edge devices: one containing devices capable of training Deep Learning models, and one containing devices incapable of training Deep Learning models. The edge devices capable of training DL models transfer there collection of locally trained models to the fog layer. The edge devices incapable of training DL models transfer their local datasets in encrypted batches to the fog layer, connected fog nodes will train a local model in place of the edge devices after decrypting the received datasets. The fog layer then sends updates to the cloud layer. Since DL models are matrices of floating point numbers, we utilize lossless compression on the local models before transferring to the next immediate layer. The cloud layer decompresses the received local models and produces a new global model based on the local models. Finally, the cloud layer compresses the updated global model for redistribution to the edge devices through the fog layer.

FIG. 3 shows the direction of flow for the data generated on the edge devices and also for the global model from the cloud server. The edge devices are either transferring locally trained Deep Learning models 304a or batches of encrypted local training data 304b to the fog layer. The fog layer is either receiving compressed local security model updates from edge devices capable of training DL models 302a or training data from the edge devices unable to train DL models 302b. Fog nodes connected to edge devices that cannot train local models will train models in place of the edge devices. The fog layer then transfers losslessly compressed models to the cloud layer 306. The cloud layer produces a global model, compresses the model, and distributes the model to the fog layer 308, which then distributes the compressed global model to the edge devices 310. The edge devices decompress the global model and executes the functions of the global model.

Figure 4:
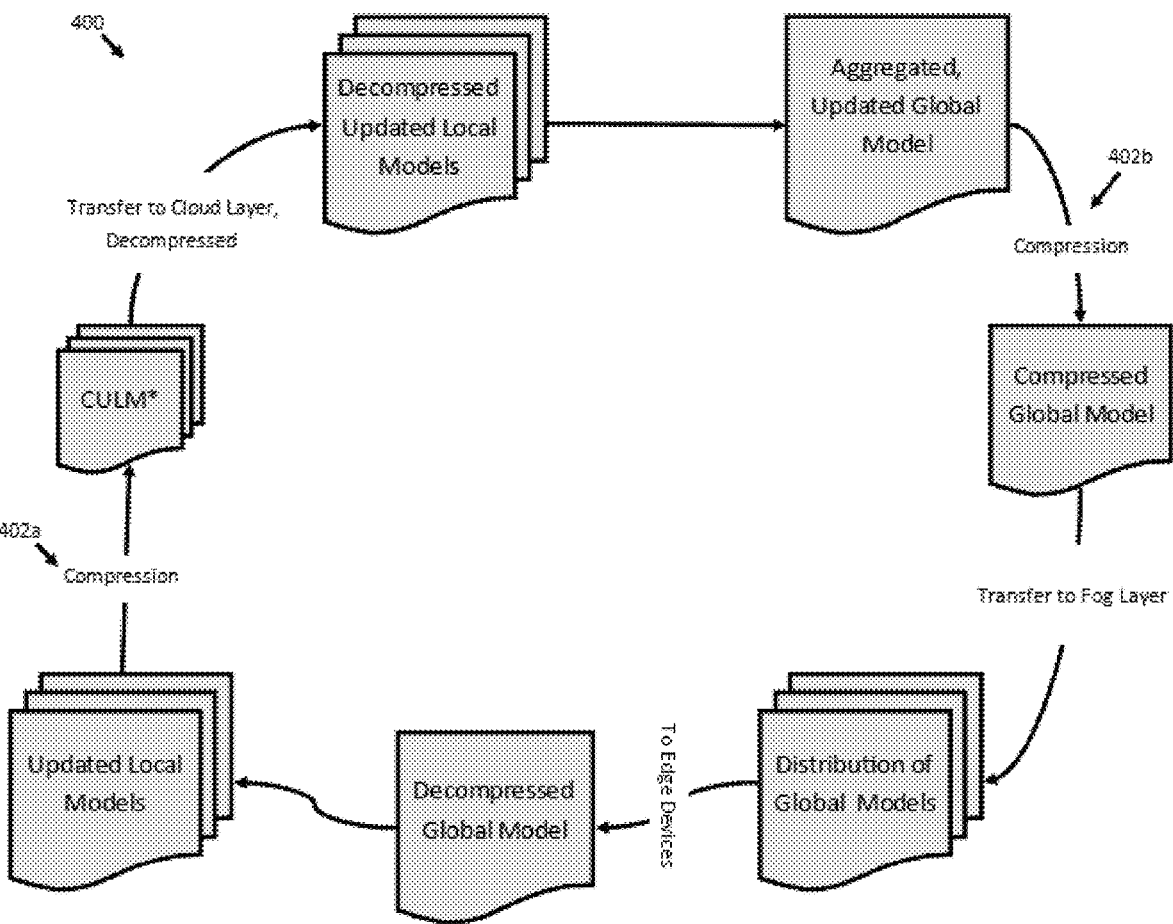
FIG. 4 Flowchart of the process in which locally trained models are compressed using lossless compression methods and sent to the fog layer, or for models trained on the fog layer, before all compressed local models are transferred to the cloud layer for decompression, aggregation into an updated global model, and evaluated. The updated global model is then compressed using lossless compression methods before being transferred to the fog layer, which distributes the compressed, updated global model to the edge devices. The edge devices decompress the received global models and use this model for intrusion detection.

FIG. 4 shows the direction of flow of the locally trained models and the global model. Edge devices that are capable of training models locally compress their respective model before transferring the compressed model to the fog layer. Edge devices that are incapable of training models locally and rely on fog nodes to train their model will instead have the fog nodes perform the lossless compression on the trained models, as in 402a. When the cloud layer begins distributing current global model, the cloud server will use lossless compression methods to compress the global model before transferring to the fog layer, as in 402b. The fog layer then distributes the compressed global model to their respective edge devices. The edge devices decompress the global model and use the model for intrusion detection.

Figure 5:
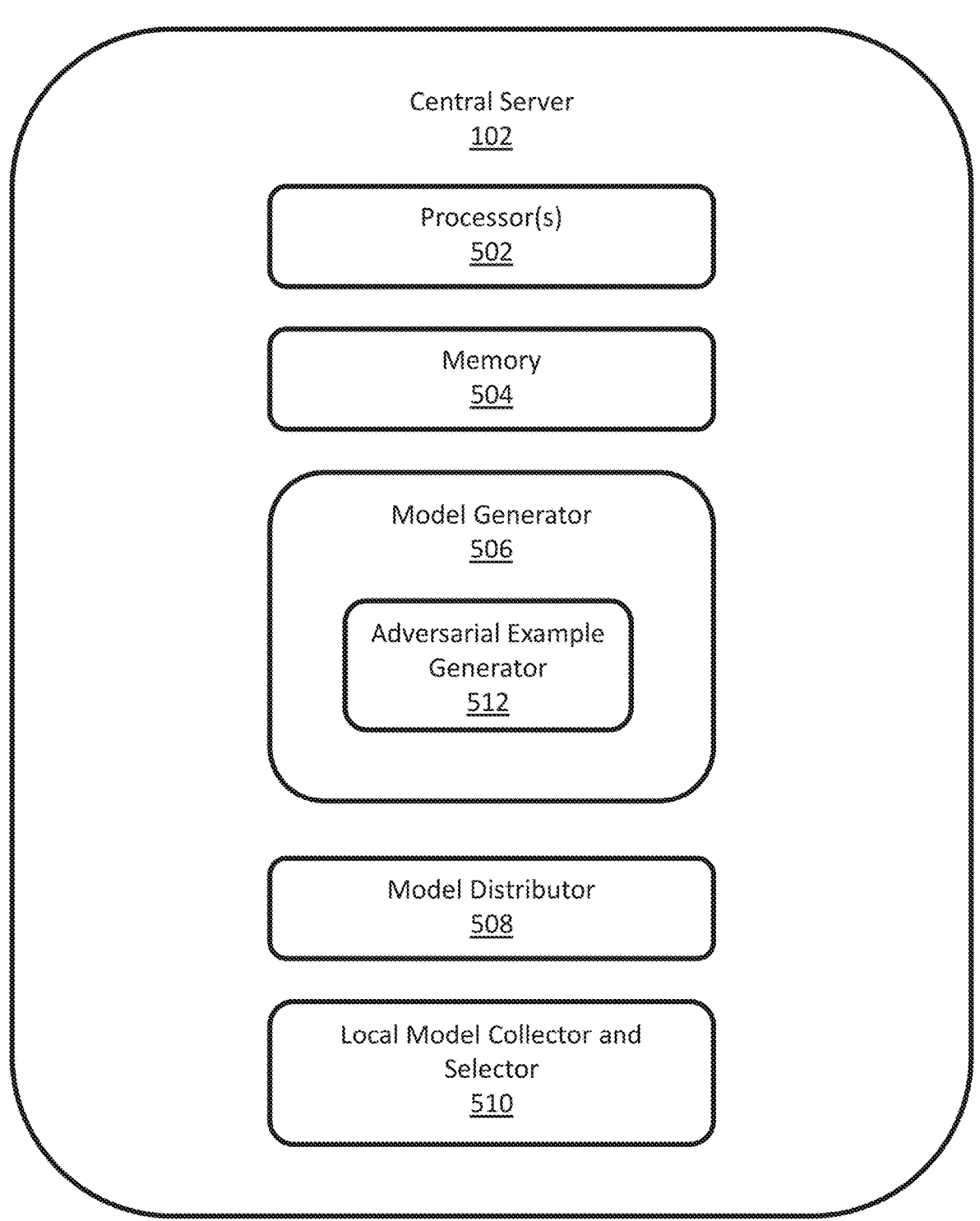
FIG. 5 Block diagram showing components of the central server, containing: Processor(s), Memory, Model Generator containing: Adversarial Example Generator; Model Distributor, and Local Model Collector and Selector.

FIG. 5 is a block diagram of an example central server 102. The central server 102 includes one or more processors 502 and memory 504 storing instructions for the processors 502. The central server 102 includes a model generator 506 configured for generating an initial security model trained on training data characterizing computer security threats. For example, the model generator 506 can use an adversarial example generator 512 and training data to train the initial security model.

The initial model, in some examples, comprises two parts. Firstly, the system uses GAN-based adversarial attacks against a black box IDS while still preserving the functional behavior of the network traffic. The training method is adversarial training, which injects adversarial examples into the training data. This helps the federated learning model to learn possible adversarial perturbations. The generator adds perturbations in an attempt to fool the discriminator while the discriminator learns to identify real or fake flows.

Secondly, the initial model can include another layer for anomaly detection. Using one type of adversarial training methods, the model becomes robust to only the adversarial samples it was trained against, making it only as effective as signature based IDS. (A signature-based IDS typically monitors inbound network traffic to find sequences and patterns that match a particular attack signature.) Using the training method of the present application, the system can include both (a) a generative federated learning-based model and (b) a linear machine learning model, both to be injected into the IDS pipeline. Therefore as disclosed herein, both known and unknown adversarial perturbations are identified and mitigated against.

The central server 102 also includes a model distributor 508 configured for distributing security models to edge nodes. For example, the model distributor 508 may maintain a list of network addresses for devices that are subscribed to receiving security updates, and the model distributor 508 can transmit the initial model and updated models to devices on the list, e.g., over a data communications network such as the Internet.

The central server 102 includes a local model collector and selector 510 configured for updating intrusion detection systems of edge nodes by collecting local security models from edge nodes and fog nodes; selecting a new local security model from the collected local security models to replace the initial security model; and distributing the new local security model to the edge nodes, causing each of the edge nodes to execute the intrusion detection system using the new local security model. For example, the local model collector and selector 510 can be configured to periodically query the edge nodes and fog nodes for local models, or the edge nodes and fog nodes can provide the local models on a rolling basis. Selecting the new local security model can include selecting a "best" local model based on one or more of: detection accuracy, computation runtime, resource usage rate, and recall score.

Figure 6:
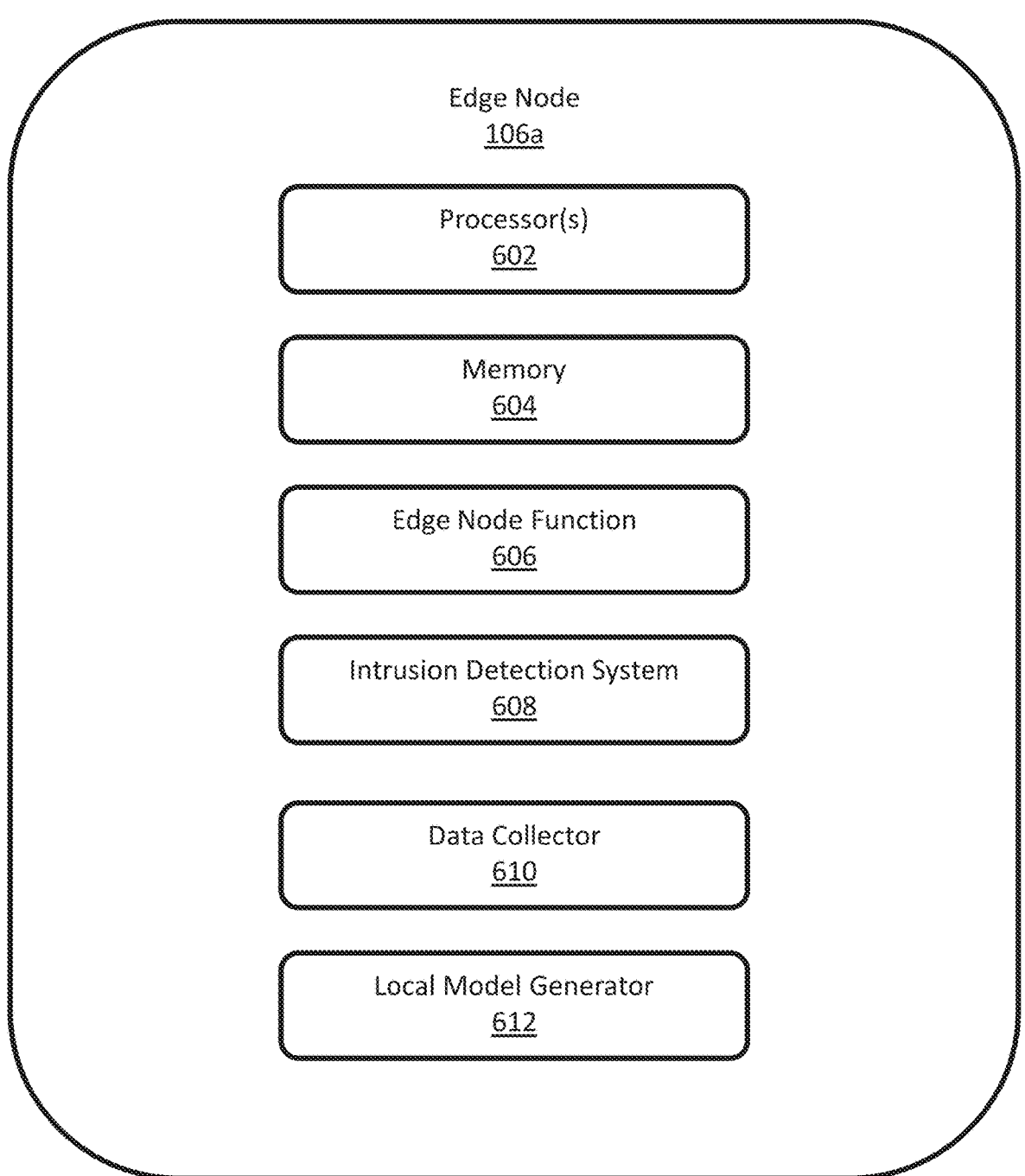
FIG. 6 Block diagram showing components of the first subset of edge nodes, containing: Processor(s), Memory, Edge Node Function, Intrusion Detection System, Data Collector, and Local Model Generator.
Figure 7:
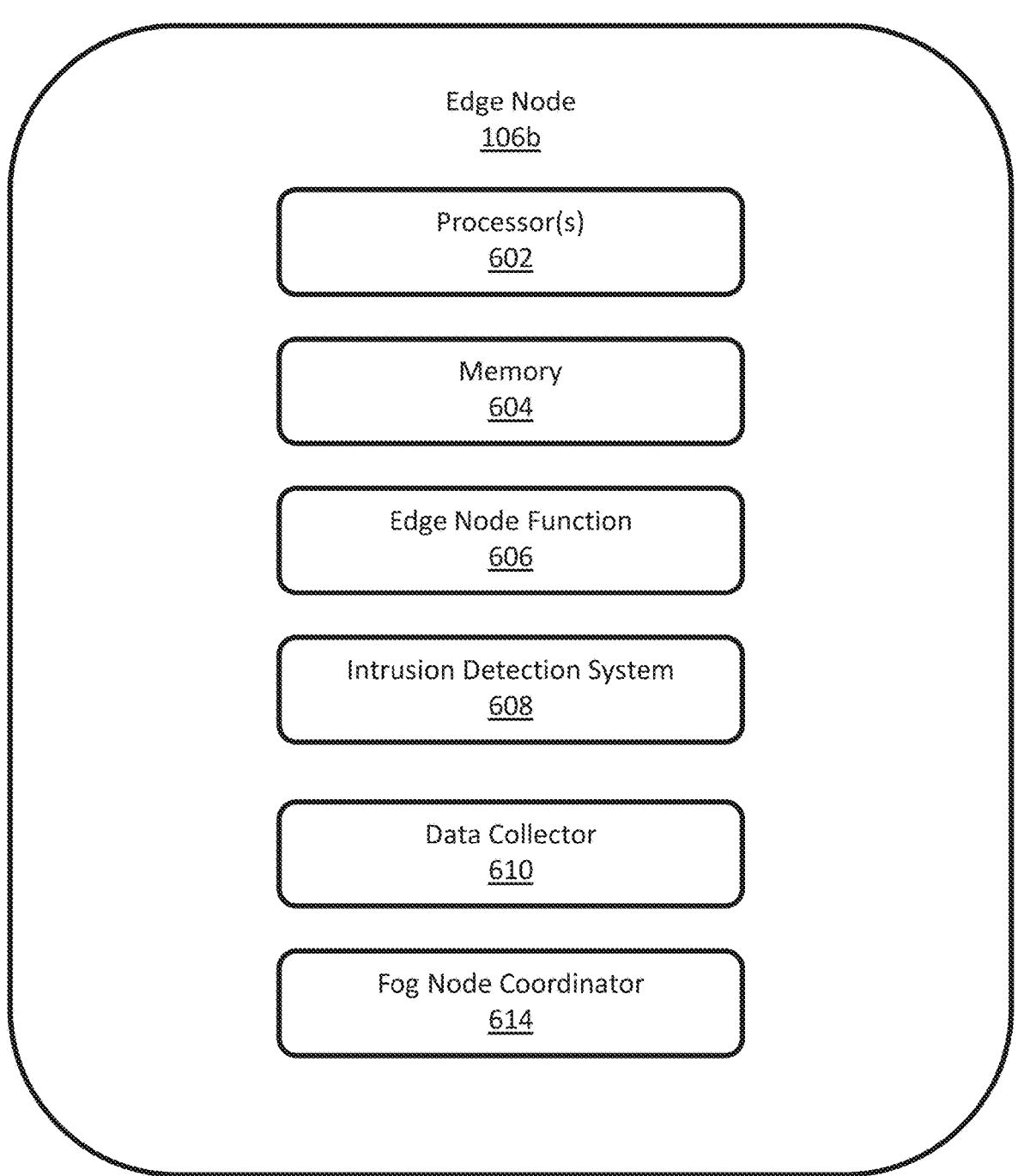
FIG. 7 Block diagram showing components of the second subset of edge nodes, containing: Processor(s), Memory, Edge Node Function, Intrusion Detection System, Data Collector, and Fog Node Coordinator.

FIG. 6 and FIG. 7 are block diagrams of example edge nodes. FIG. 6 is a block diagram of an example edge node 106a that trains a local model, and FIG. 7 is a block diagram of an example edge node 106c that does not train a local model, where a fog node instead performs the model training.

FIG. 6 shows an edge node 106a having one or more processors 602 and memory 604 storing instructions for the processors. The edge node 106a includes at least one edge node function 606 which is configured for performing a task during live operation of the edge node 106a, e.g., collecting, processing, and transmitting data. The edge node 106a also includes an intrusion detection system 608 which is configured to detect and, in some cases, stop computer security attacks against the edge node 106a using a security model. The intrusion detection system 608 initially uses a model provided by the central server 102 and later uses a local model trained on the edge node 106a.

The edge node 106a includes a data collector 610 and a local model generator 612. The data collector 610 collects data during live operation of the edge node 106a, for example, the data collector 610 can collect data from one or more sensors or network traffic from a communications system that is a component of the edge node 106a. The local model generator 612 is configured for generating a local security model using the initial security model and the collected data. The intrusion detection system 608 provides live feedback to the local model on real data collected at the edge node 106a during live operation. The local model generator 612 can be configured to use adaptive transfer learning. Transfer learning can include reusing the knowledge in source tasks to improve the learning of a target task, and adaptive transfer learning can include adapting a transfer learning process as it proceeds.

FIG. 7 shows an edge node 106*c* that lacks the local model generator 612. Generating the local model can, in some cases, require computing resources for generating the model under specified target conditions, e.g., a specified amount of time. In some cases, the edge node 106*c* lacks one or more of: sufficient processing resources, sufficient memory resources, or sufficient communications resources for training and transmitting a local security model within a specified timeframe. In some cases, the edge node 106*c* has an inconsistent connection to a data communications network connecting to the central server 102.

Instead, the edge node 106*c* has a fog node coordinator 614. The fog node coordinator 614 communicates with a fog node, e.g., by sending the data from the data collector 610 to the fog node, so that the fog node can generate a local model using the collected data. The fog node coordinator 614 can, in some examples, be configured for finding a suitable fog node, e.g., by selecting a fog node from a list of network addresses of fog nodes, or by polling fog nodes to find one that is available or has a more reliable communications path. The fog node coordinator 614 can provide the collected data in any appropriate manner, e.g., periodically, such as when a threshold amount of data has been received, or in response to a query from the fog node.

Figure 8:
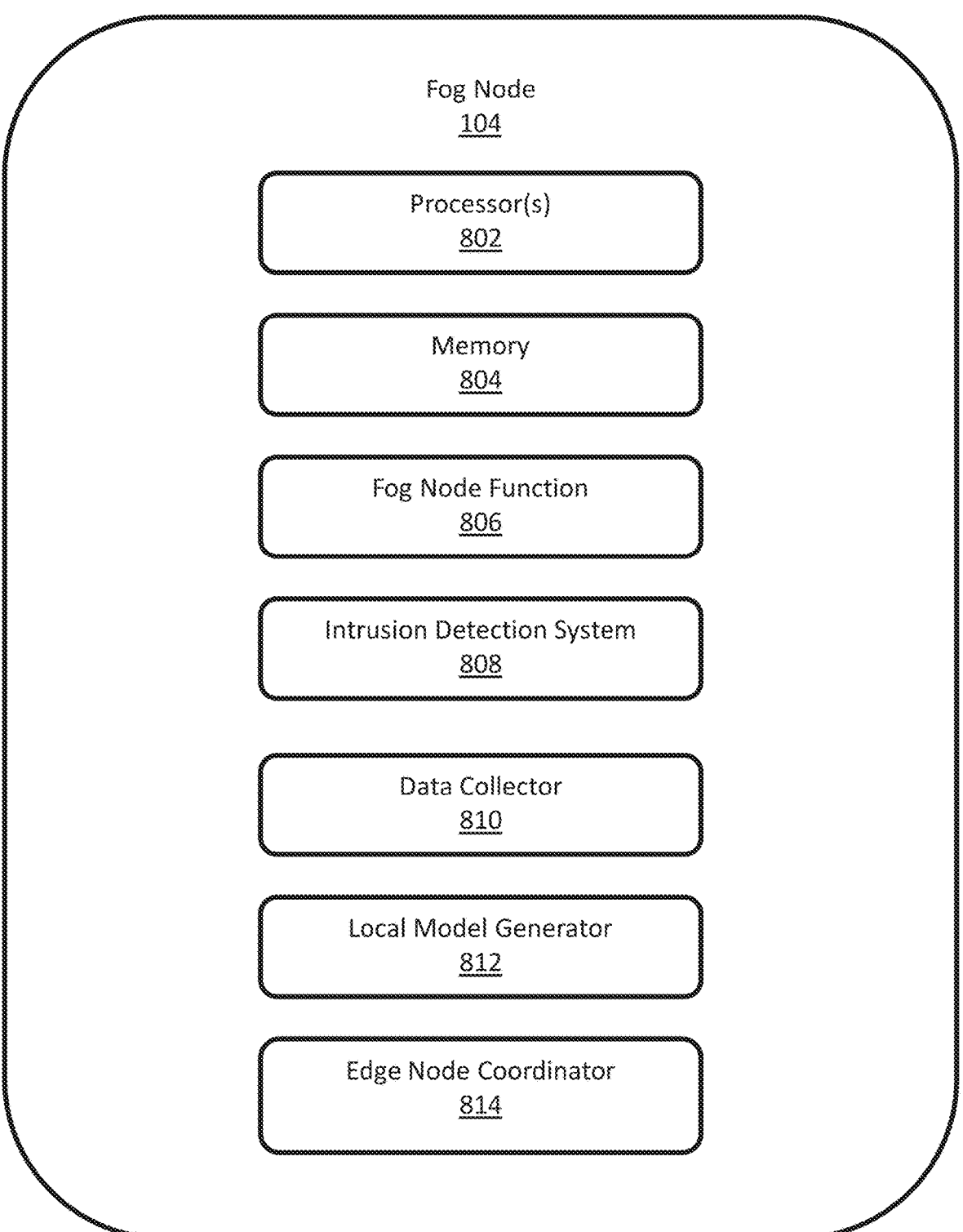
FIG. 8 Block diagram showing components of the fog nodes, containing: Processor(s), Memory, Fog Node Function, Intrusion Detection System, Data Collector, Local Model Generator, and Edge Node Coordinator.

FIG. 8 is a block diagram of an example fog node 104. The fog node 104 includes one or more processors 802 and memory 804 storing instructions for the processors 802. The fog node 104 includes at least one fog node function 806 configured for, e.g., routing or monitoring data communications traffic. The fog node 104 can include an intrusion detection system 808.

The fog node 104 includes a data collector 810 and a local model generator 812. The data collector 810 and local model generator 812 are configured for receiving data from one or more edge nodes that do not generate local models, e.g., because they lack sufficient computing resources. The fog node 104 includes an edge node coordinator 814 configured for communicating with edge nodes that use the fog node 104 for generating local security models.

In some examples, the edge node coordinator 814 is configured for finding edge nodes that are not building models and establishing communications with those edge nodes. For example, the edge node coordinator 814 may have a list of network addresses of edge nodes (e.g., transmitted by the central server 102) and can be configured to query each of the edge nodes to determine if the edge node is generating a local model or if the edge node lacks sufficient resources to generate a local model. The edge node can, e.g., transmit a message stating that it is not generating a local modal, or the edge node can transmit a message specifying one or more computing resources so that the edge node coordinator 814 can determine whether or not the edge node can generate the local model or if the fog node 104 will generate the local model.

Figure 9:
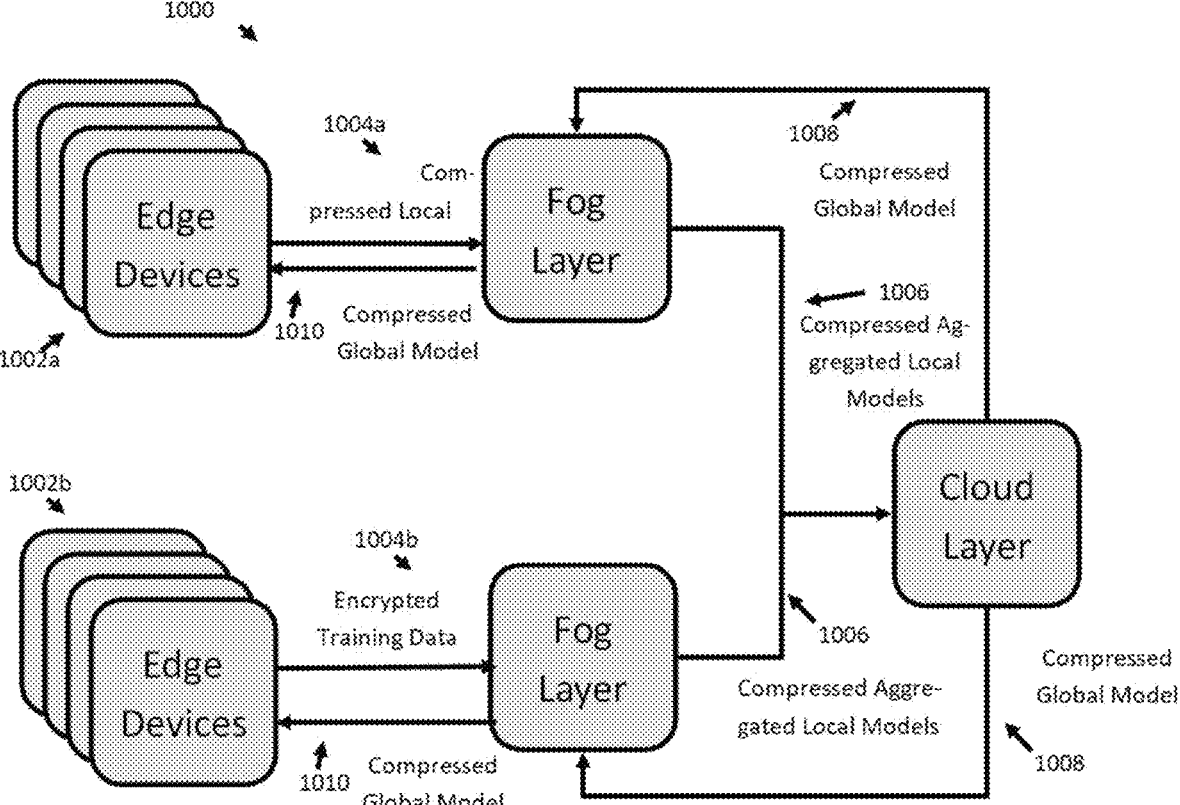
FIG. 9 Diagram showing two sets of edge devices: one containing devices capable of training Deep Learning models, and one containing devices incapable of training Deep Learning models. The edge devices capable of training DL models transfer there collection of locally trained models to the fog layer. The edge devices incapable of training DL models transfer their local datasets in encrypted batches to the fog layer, connected fog nodes will train a local model in place of the edge devices after decrypting the received datasets. The fog layer performs local model aggregation using the security updates received from the edge devices from the set of edge devices that can train DL models and from locally trained models using training data from edge devices unable to train DL models. The fog layer then sends fewer updates to the cloud layer. Since DL models are matrices of floating point numbers, we utilize lossless compression on the local models before transferring to the next immediate layer. The cloud layer decompresses the received local models and produces a new global model based on the local models. Finally, the cloud layer compresses the updated global model for redistribution to the edge devices through the fog layer.

FIG. 9 shows the direction of flow for the data generated on the edge devices and also for the global model from the cloud server. The edge devices are either transferring locally trained Deep Learning models 1004*a* or batches of encrypted local training data 1004*b* to the fog layer. The fog layer is either receiving compressed local security model updates from edge devices capable of training DL models 1002*a* or training data from the edge devices unable to train DL models 1002*b*. Fog nodes connected to edge devices that cannot train local models will train models in place of the edge devices. The fog layer then aggregates the received local security update models from edge nodes that can train DL models 1002*a* or the fog layer aggregates local security model updates from training DL models after receiving training data from edge devices unable to train DL models 1002*b* transfers losslessly compressed models to the cloud layer 1006. The cloud layer produces a global model, compresses the model, and distributes the model to the fog layer 1008, which then distributes the compressed global model to the edge devices 1010. The edge devices decompress the global model and executes the functions of the global model.

In some examples, the fog node 104 is a dedicated device or system of devices for generating local models for edge nodes. The fog node 104 can be a location based hub that performing model generation for edge nodes within a certain distance (physical distance or network distance). Since many edge devices lack computation power, a location-based hub that has relatively higher computation power than edge devices will act as an intermediary. The location-based fog hub will perform training to generate local security models for those devices that do not meet the necessary specifications.

For the resource-constrained edge devices, data can be encrypted and sent in batches before uploading to the fog hub. Several edge devices can be monitored by the fog hub, which can act as a controller. The controller can be configured with a secure mechanism to fend off backdoor and other standard attacks, and it can also be configured to monitor traffic real-time and apply adaptive learning and transfer learning under the overall scope of federated learning. This setup extends the decentralized concept to the distributed federated learning framework. Instead of a single point of failure, which used to be the central server, inserting fog layers will ensure the general operations proceed as normal, even if certain nodes are under siege from intruders.

In this manner, a robust adaptive transfer learning model can be placed on the fog layer. The fog layer can be responsible for converting and organizing incoming data based on the transmission protocols. As new live data arrives on the edge devices, e.g., periodically, a new batch of data is sent to the fog hub for adaptive transfer learning. The best model on the fog node 104 (e.g., where the fog node 104 serves multiple edge nodes and selects one as described above with respect to the central server 102) will be uploaded to the central server 102 for further evaluation.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system comprising:
a central server configured for:
    generating an initial security model trained on training data characterizing a plurality of different computer security threats; and
    distributing the initial security model to a plurality of edge nodes;
the plurality of edge nodes, wherein each edge node comprises at least one processor configured for executing an intrusion detection system using the initial security model, wherein the plurality of edge nodes comprises:
    a first subset of edge nodes each of which is configured for training a respective local security model using captured security data during live operation; and
    a second subset of edge nodes each of which is not configured for training a local security model;
a plurality of fog nodes, each fog node being on a communications path between at least one edge node and the central server, wherein at least a first fog node comprises a processor configured for training a respective local security model for one or more of the edge nodes from the second subset of edge nodes;
wherein the central server is configured for updating the intrusion detection systems of the edge nodes by:
    collecting the local security models from the first subset of edge nodes and the first fog node;
    selecting a first local security model from the collected local security models to replace the initial security model; and
    distributing the first local security model to the edge nodes, causing each of the edge nodes to execute the intrusion detection system using the first local security model.

2. The system of claim 1, wherein at least one of the central server and the first fog node is configured for determining that the one or more of the edge nodes from the second subset of edge nodes lacks at least one computing resource and, in response, configuring the first fog node for training the respective local security model for the one or more of the edge nodes from the second subset of edge nodes.

3. The system of claim 2, wherein determining that the one or more of the edge nodes from the second subset of edge nodes lacks at least one computing resource comprises determining that the one or more of the edge nodes from the second subset of edge nodes lacks one or more of: sufficient processing resources, sufficient memory resources, or sufficient communications resources for training and transmitting a local security model within a specified timeframe.

4. The system of claim 2, wherein determining that the one or more of the edge nodes from the second subset of edge nodes lacks at least one computing resource comprises determining that the one or more of the edge nodes from the second subset of edge nodes has an inconsistent connection to a data communications network connecting to the central server.

5. The system of claim 2, wherein determining that the one or more of the edge nodes from the second subset of edge nodes lacks at least one computing resource comprises querying the one or more of the edge nodes from the second subset of edge nodes.

6. The system of claim 1, wherein the at least one fog node is configured for receiving captured security data during live operation from the one or more of the edge nodes from the second subset of edge nodes.

7. The system of claim 1, wherein collecting the local security models from the first subset of edge nodes and the first fog node comprises periodically querying the first subset of edge nodes for the local security models.

8. The system of claim 1, wherein the captured security data comprises one or more of: global positioning system (GPS) location, internet protocol (IP) address, and user metadata.

9. The system of claim 1, wherein selecting a first local security model from the collected local security models to replace the initial security model comprises selecting the first local security model based on one or more of: detection accuracy, computation runtime, resource usage rate, and recall score.

10. The system of claim 1, wherein generating the initial security model comprises generating a plurality of adversarial examples using a generative adversarial network and injecting the adversarial examples into the training data.

11. A method comprising:
generating, by a central server, an initial security model trained on training data characterizing a plurality of different computer security threats;
distributing, by the central server, the initial security model to a plurality of edge nodes, wherein each edge node comprises at least one processor configured for executing an intrusion detection system using the initial security model, wherein the plurality of edge nodes comprises:
    a first subset of edge nodes each of which is configured for training a respective local security model using captured security data during live operation; and
    a second subset of edge nodes each of which is not configured for training a local security model;
training, by at least a first fog node being on a communications path between at least one edge node and the central server, a respective local security model for one or more of the edge nodes from the second subset of edge nodes; and
updating, by the central server, the intrusion detection systems of the edge nodes by:
    collecting the local security models from the first subset of edge nodes and the first fog node;
    selecting a first local security model from the collected local security models to replace the initial security model; and
    distributing the first local security model to the edge nodes, causing each of the edge nodes to execute the intrusion detection system using the first local security model.

12. The method of claim 11, wherein at least one of the central server and the first fog node is configured for determining that the one or more of the edge nodes from the second subset of edge nodes lacks at least one computing resource and, in response, configuring the first fog node for training the respective local security model for the one or more of the edge nodes from the second subset of edge nodes.

13. The method of claim 12, wherein determining that the one or more of the edge nodes from the second subset of edge nodes lacks at least one computing resource comprises determining that the one or more of the edge nodes from the second subset of edge nodes lacks one or more of: sufficient processing resources, sufficient memory resources, or sufficient communications resources for training and transmitting a local security model within a specified timeframe.

14. The method of claim 12, wherein determining that the one or more of the edge nodes from the second subset of edge nodes lacks at least one computing resource comprises determining that the one or more of the edge nodes from the second subset of edge nodes has an inconsistent connection to a data communications network connecting to the central server.

15. The method of claim 12, wherein determining that the one or more of the edge nodes from the second subset of edge nodes lacks at least one computing resource comprises querying the one or more of the edge nodes from the second subset of edge nodes.

16. The method of claim 11, wherein the at least a first fog node is configured for receiving captured security data during live operation from the one or more of the edge nodes from the second subset of edge nodes.

17. The method of claim 11, wherein collecting the local security models from the first subset of edge nodes and the first fog node comprises periodically querying the first subset of edge nodes for the local security models.

18. The method of claim 11, wherein the captured security data comprises one or more of: global positioning system (GPS) location, internet protocol (IP) address, and user metadata.

19. The method of claim 11, wherein selecting a first local security model from the collected local security models to replace the initial security model comprises selecting the first local security model based on one or more of: detection accuracy, computation runtime, resource usage rate, and recall score.

20. The method of claim 11, wherein generating the initial security model comprises generating a plurality of adversarial examples using a generative adversarial network and injecting the adversarial examples into the training data.

21. The method of claim 11, wherein applying compression to the collected local security models from the first subset of edge nodes and the first fog node comprises periodically querying the first subset of edge nodes for the local security models.

22. The method of claim 11, wherein applying compression to the replaced initial security model trained on the second set of fog nodes comprises periodically querying the second subset of edge nodes for updating the local security model on the central server.

23. The method of claim 11, wherein the first and second fog nodes perform local security model updates using collected local security model updates from the edge nodes.

24. The method of claim 11, wherein the first and second fog nodes perform aggregation of local security model updates using collected local security model updates from the edge nodes.

25. The method of claim 11, wherein the first and second fog nodes perform aggregation of local security model updates using generated local security model updates on the at least a first fog node.

26. A system for intrusion detection using federated learning, the system comprising:

a central server configured for:

generating an initial security model trained on training data characterizing a plurality of different computer security threats; and distributing the initial security model to a plurality of edge nodes, wherein each edge node comprises at least one processor configured for executing an intrusion detection system using the initial security model;

at least one fog node on a communications path between at least one edge node and the central server, wherein the fog node comprises a processor configured for training a respective local security model for one or more of the edge nodes;

wherein the central server is configured for updating the intrusion detection systems of the edge nodes by:

collecting local security models from at least a first edge node and the fog node;

selecting a first local security model from the collected local security models to replace the initial security model; and distributing the first local security model to the edge nodes, causing each of the edge nodes to execute the intrusion detection system using the first local security model.

* * * * *